US008447127B2

United States Patent
Gomila et al.

(10) Patent No.: US 8,447,127 B2
(45) Date of Patent: *May 21, 2013

(54) FILM GRAIN SIMULATION METHOD

(75) Inventors: Cristina Gomila, Princeton, NJ (US); Joan Llach, Princeton, NJ (US); Jeffrey Allen Cooper, Rocky Hill, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/589,217

(22) Filed: Oct. 20, 2009

(65) Prior Publication Data

US 2010/0080455 A1  Apr. 1, 2010

Related U.S. Application Data

(63) Continuation of application No. 11/246,848, filed on Oct. 7, 2005, now abandoned.

(51) Int. Cl.
| | |
|---|---|
| G06K 9/46 | (2006.01) |
| G06K 9/66 | (2006.01) |
| G06K 9/62 | (2006.01) |
| G06K 9/40 | (2006.01) |
| H04N 7/01 | (2006.01) |
| H04N 11/20 | (2006.01) |
| H04N 1/32 | (2006.01) |
| H04N 1/41 | (2006.01) |
| H04N 7/12 | (2006.01) |
| H04N 11/02 | (2006.01) |
| H04N 11/04 | (2006.01) |
| H04B 1/66 | (2006.01) |
| G06K 9/36 | (2006.01) |

(52) U.S. Cl.
USPC .......... 382/254; 382/191; 382/224; 382/232; 382/276; 348/441; 375/240.25; 358/426.01

(58) Field of Classification Search
USPC ................ 382/100, 232, 255; 348/441–448; 375/240.24–240.26, 240.29; 358/426.01, 358/426.04
See application file for complete search history.

(56) References Cited

U.S. PATENT DOCUMENTS

| 4,897,775 A | 1/1990 | Kaassens |
|---|---|---|
| 4,935,816 A | 6/1990 | Faber |

(Continued)

FOREIGN PATENT DOCUMENTS

| EP | 0364285 | 4/1990 |
|---|---|---|
| EP | 0373615 | 6/1990 |

(Continued)

OTHER PUBLICATIONS

Office Action from U.S. Appl. No. 10/556,834 mailed Aug. 19, 2008.

(Continued)

*Primary Examiner* — Randolph I Chu
*Assistant Examiner* — Nathan Bloom
(74) *Attorney, Agent, or Firm* — Robert D. Shedd; Robert B. Levy (57) ABSTRACT

Briefly, in accordance with a preferred embodiment of the present principles, simulation of a block of film grain for addition to a block of an image occurs by first establishing at least one image parameter in accordance with at least one attribute of the block. Thereafter, a block of film grain is established in accordance with the image parameter. Deblocking filtering can be applied to the film grain block.

15 Claims, 3 Drawing Sheets

U.S. PATENT DOCUMENTS

| | | |
|---|---|---|
| 4,998,167 A | 3/1991 | Jaqua |
| 5,028,280 A | 7/1991 | Ihara et al. |
| 5,140,414 A | 8/1992 | Mowry |
| 5,216,556 A | 6/1993 | Steinberg et al. |
| 5,262,248 A | 11/1993 | Ihara et al. |
| 5,285,402 A | 2/1994 | Keith |
| 5,335,013 A | 8/1994 | Faber |
| 5,374,954 A | 12/1994 | Mowry |
| 5,406,326 A | 4/1995 | Mowry |
| 5,453,840 A | 9/1995 | Parker et al. |
| 5,457,491 A | 10/1995 | Mowry |
| 5,461,596 A | 10/1995 | Barrett |
| 5,471,572 A | 11/1995 | Buchner et al. |
| 5,475,425 A | 12/1995 | Przyborski et al. |
| 5,526,446 A | 6/1996 | Adelson et al. |
| 5,550,815 A | 8/1996 | Cloonan et al. |
| 5,629,769 A | 5/1997 | Cookingham et al. |
| 5,641,596 A | 6/1997 | Gray et al. |
| 5,659,382 A | 8/1997 | Rybczynski |
| 5,687,011 A | 11/1997 | Mowry |
| 5,706,361 A | 1/1998 | Kent et al. |
| 5,709,972 A | 1/1998 | Cookingham et al. |
| 5,715,008 A | 2/1998 | Sekiguchi et al. |
| 5,742,892 A | 4/1998 | Chaddha |
| 5,767,860 A | 6/1998 | Zimmer et al. |
| 5,805,782 A | 9/1998 | Foran |
| 5,817,447 A | 10/1998 | Yip |
| 5,831,673 A | 11/1998 | Przyborski et al. |
| 5,832,172 A | 11/1998 | Jeon |
| 5,845,017 A | 12/1998 | Keyes |
| 5,917,609 A | 6/1999 | Breeuwer et al. |
| 6,067,125 A | 5/2000 | May |
| 6,134,200 A | 10/2000 | Timmermans |
| 6,216,838 B1 | 4/2001 | Bacher et al. |
| 6,219,838 B1 | 4/2001 | Cherichetti et al. |
| 6,233,647 B1 | 5/2001 | Bentz et al. |
| 6,269,180 B1 | 7/2001 | Sevigny |
| 6,285,711 B1 | 9/2001 | Ratakonda et al. |
| 6,327,304 B1 | 12/2001 | Miller et al. |
| 6,327,391 B1 | 12/2001 | Ohnishi et al. |
| 6,370,192 B1 | 4/2002 | Pearlstein et al. |
| 6,373,992 B1 | 4/2002 | Nagao |
| 6,441,918 B1 | 8/2002 | Hori |
| 6,459,699 B1 | 10/2002 | Kimura et al. |
| 6,496,221 B1 | 12/2002 | Wolf et al. |
| 6,559,849 B1 | 5/2003 | Anderson et al. |
| 6,587,509 B1 | 7/2003 | Suzuki et al. |
| 6,650,327 B1 | 11/2003 | Airey et al. |
| 6,665,369 B2 | 12/2003 | Ukita |
| 6,667,815 B1 | 12/2003 | Nagao |
| 6,724,942 B1 | 4/2004 | Arai |
| 6,728,317 B1 | 4/2004 | Demos |
| 6,744,928 B1 | 6/2004 | Juri et al. |
| 6,839,152 B2 | 1/2005 | Fan et al. |
| 6,868,190 B1 | 3/2005 | Morton |
| 6,963,668 B2 | 11/2005 | Engeldrum et al. |
| 6,990,251 B2 | 1/2006 | Edgar |
| 6,990,252 B2 | 1/2006 | Shekter |
| 6,995,793 B1 | 2/2006 | Albadawi et al. |
| 7,065,256 B2 | 6/2006 | Alon et al. |
| 7,092,016 B2 | 8/2006 | Morton et al. |
| 7,106,907 B2 | 9/2006 | Lin et al. |
| 7,245,783 B2 | 7/2007 | Fielding |
| 7,362,911 B1 | 4/2008 | Frank |
| 7,596,239 B2 | 9/2009 | Winger et al. |
| 7,630,005 B2 | 12/2009 | Takei |
| 7,653,132 B2 | 1/2010 | Dane |
| 7,664,337 B2 | 2/2010 | Balram et al. |
| 7,680,356 B2 | 3/2010 | Boyce et al. |
| 7,738,722 B2 | 6/2010 | Gomila et al. |
| 7,742,655 B2 | 6/2010 | Gomila et al. |
| 7,856,055 B2 | 12/2010 | Zhou et al. |
| 7,958,532 B2 | 6/2011 | Paul et al. |
| 2001/0056568 A1 | 12/2001 | Hirotsu et al. |
| 2002/0003903 A1 | 1/2002 | Engeldrum et al. |
| 2002/0016103 A1 | 2/2002 | Behnke |
| 2002/0034337 A1 | 3/2002 | Shekter |
| 2002/0106103 A1 | 8/2002 | Jones et al. |
| 2002/0120972 A1 | 9/2002 | Nakamura |
| 2002/0133764 A1 | 9/2002 | Wang |
| 2002/0154140 A1 | 10/2002 | Tazaki |
| 2002/0163657 A1 | 11/2002 | Bogdanowicz et al. |
| 2002/0171649 A1 | 11/2002 | Fogg |
| 2003/0011615 A1 | 1/2003 | Tidwell |
| 2003/0031128 A1 | 2/2003 | Kim et al. |
| 2003/0043922 A1 | 3/2003 | Kalker et al. |
| 2003/0063778 A1 | 4/2003 | Rowe et al. |
| 2003/0068097 A1 | 4/2003 | Wilson et al. |
| 2003/0086623 A1 | 5/2003 | Berkner et al. |
| 2003/0101453 A1 | 5/2003 | Matsuyama et al. |
| 2003/0206231 A1 | 11/2003 | Chen et al. |
| 2003/0206662 A1 | 11/2003 | Avinash et al. |
| 2003/0218610 A1 | 11/2003 | Mech et al. |
| 2004/0006575 A1 | 1/2004 | Visharam et al. |
| 2004/0013308 A1 | 1/2004 | Jeon et al. |
| 2004/0071363 A1 | 4/2004 | Kouri et al. |
| 2004/0073926 A1 | 4/2004 | Nakamura et al. |
| 2004/0101059 A1 | 5/2004 | Joch et al. |
| 2004/0208389 A1 | 10/2004 | Lin |
| 2004/0264795 A1 | 12/2004 | Fielding |
| 2006/0007460 A1 | 1/2006 | Bogdanowicz et al. |
| 2006/0013320 A1 | 1/2006 | Oguz et al. |
| 2006/0072660 A1 | 4/2006 | Jia et al. |
| 2006/0082649 A1 | 4/2006 | Gomila et al. |
| 2006/0083316 A1 | 4/2006 | Cooper et al. |
| 2006/0083426 A1 | 4/2006 | Cooper et al. |
| 2006/0083429 A1 | 4/2006 | Rjoly |
| 2006/0104366 A1 | 5/2006 | Huang et al. |
| 2006/0133686 A1 | 6/2006 | Gomila et al. |
| 2006/0182183 A1 | 8/2006 | Winger |
| 2006/0183275 A1 | 8/2006 | Schoner et al. |
| 2006/0256853 A1 | 11/2006 | Schlockermann et al. |
| 2006/0256871 A1 | 11/2006 | Boyce et al. |
| 2006/0291557 A1 | 12/2006 | Tourapis |
| 2007/0002947 A1 | 1/2007 | Lu et al. |
| 2007/0030996 A1 | 2/2007 | Winger et al. |
| 2007/0036452 A1* | 2/2007 | Llach et al. .................. 382/254 |
| 2007/0047658 A1 | 3/2007 | Tourapis et al. |
| 2007/0058866 A1 | 3/2007 | Boyce et al. |
| 2007/0058878 A1* | 3/2007 | Gomilla et al. ............... 382/254 |
| 2007/0070241 A1* | 3/2007 | Boyce et al. .................. 348/441 |
| 2007/0104380 A1 | 5/2007 | Gomila et al. |
| 2007/0117291 A1 | 5/2007 | Cooper et al. |
| 2007/0140588 A1 | 6/2007 | Balram et al. |
| 2007/0297515 A1 | 12/2007 | Gomila et al. |
| 2008/0252781 A1 | 10/2008 | DeWaele et al. |
| 2010/0104025 A1 | 4/2010 | Rose et al. |

FOREIGN PATENT DOCUMENTS

| | | |
|---|---|---|
| EP | 0756281 | 3/1997 |
| EP | 0800313 | 10/1997 |
| EP | 0575006 | 10/1999 |
| EP | 0622000 | 3/2000 |
| EP | 1175091 | 1/2002 |
| EP | 1215624 | 6/2002 |
| EP | 1511320 | 3/2005 |
| GB | 2312124 | 10/1997 |
| JP | 1156069 | 6/1989 |
| JP | 04-097681 | 3/1992 |
| JP | 04349458 | 12/1992 |
| JP | 5252459 | 9/1993 |
| JP | 8079765 | 3/1996 |
| JP | 8149466 | 6/1996 |
| JP | 9062718 | 3/1997 |
| JP | 9139940 | 5/1997 |
| JP | 9247681 | 9/1997 |
| JP | 9275529 | 10/1997 |
| JP | 10509297 | 9/1998 |
| JP | 20041242 | 8/2000 |
| JP | 2001357090 | 12/2001 |
| JP | 2001357095 | 12/2001 |
| JP | 2002359845 | 12/2002 |
| JP | 2002374541 | 12/2002 |
| JP | 200324326 | 1/2003 |
| JP | 2003163853 | 6/2003 |
| JP | 2003179923 | 6/2003 |
| JP | 2004120057 | 4/2004 |

| | | |
|---|---|---|
| JP | 2004135169 | 4/2004 |
| JP | 2007529945 | 10/2007 |
| RU | 2073913 | 9/1991 |
| RU | 2088962 | 8/1997 |
| RU | 2139637 | 10/1999 |
| WO | WO9206409 | 4/1992 |
| WO | WO9314591 | 7/1993 |
| WO | WO9520292 | 7/1995 |
| WO | WO 97/10676 | 3/1997 |
| WO | WO9722204 | 6/1997 |
| WO | WO9841026 | 9/1998 |
| WO | WO 00/18109 | 3/2000 |
| WO | WO0146992 | 6/2001 |
| WO | WO0174064 | 10/2001 |
| WO | WO0177871 | 10/2001 |
| WO | WO 02/33958 | 4/2002 |
| WO | WO0251160 | 6/2002 |
| WO | WO03005731 | 1/2003 |
| WO | WO2004034518 | 4/2004 |
| WO | WO2004095829 | 11/2004 |
| WO | WO2004104931 | 12/2004 |
| WO | WO2004105250 | 12/2004 |
| WO | WO2005/027045 | 3/2005 |
| WO | WO2005032143 | 4/2005 |
| WO | WO2005034518 | 4/2005 |
| WO | WO2005039188 | 4/2005 |
| WO | WO2005039189 | 4/2005 |
| WO | WO2006022705 | 3/2006 |
| WO | WO2006/057703 | 6/2006 |

OTHER PUBLICATIONS

Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
McLean, I, et al., "Telecine Noise Reduction", IEE Seminar Digital Restoration of Film and Video Archives (Ref. No. 01/049), IEE Seminar Digital Restoration of Film and Video Archives, London, UK. Jan. 16, 2001, pp. 2/1-2/6.
Yan, Jacky Chun Kit, et al. "Film Grain Noise Removal and Generation for Color Images", 1997 IEEE Signal Processing Workshop on Higher-Order Statistics, Jul. 21-23, Banff, Alberta, Canada. pp. 73-76.
Yan, Jacky Chun Kit, et al. "Signal Dependent Film Grain Noise Removal and Generation Based on Higher-Order Statistics", 1997 IEEE Signal Processing Workshop on Higher-Order Statistics, Jul. 21-23, Banff, Alberta, Canada. pp. 77-81.
Al-Shaykh, Osama K., et al., "Restoration of Lossy Compressed Noisy Images", IEEE Transactions of Image Processing, vol. 8. No. 10, pp. 1348-1360, Oct. 1999.
Al-Shaykh, Osama K, et al. "Lossy Compression of Images Corrupted by Film Grain Noise", Proceedings International Conference on Image Processing, Sep. 16-19, 1996, Lausanne, Switzerland vol. I of III, pp. 805-808.
Campisi, P. et al. "Signal-dependent film grain noise generation using homomorphic adaptive filtering.", IEE Proceedings Vision, Image and Signal Processing, vol. 147, No. 3 pp. 283-287 Jun. 2000.
Yoshida, J, "Go with the Grain, Film R&D Chief Urges, for Art's Sake". EETimes, http://www.eetimes.com/showArticle.jhtml?articleID=59301182 (last checked Jul. 23, 2007).
Zhao, Lifeng, et al., "Constant Quality Rate Control for Streaming MPEG-4 FGS Video", IEEE, 2002, pp. 544-547.
Al-Shaykh, Osama K, et al., "Lossy Compression of Noisy Images", IEEE Transactions on Image Processing vol. 7, No. 12, Dec. 1998, pp. 1641-1652.

Brightwell, PJ, et al., "Automated Correction of Film Unsteadiness, Dirt and Grain", International Broadcasting Convention, Sep. 16-20, 1994 Conference Publication, No. 397.
Oktem, R, et al., "Transform Domain Algorithm for Reducing Effect of Film Grain Noise in Image Compression", Electronics Letters, vol. 35, No. 21, Oct. 14, 1999, pp. 1830-1831.
Fischer, Marco, et al., "Image Sharpening Using Permutation Weighted Medians", Dept of Electrical Engineering, University of Delware Newark, DE, pp. 1-4, 2002.
Shahnaz, Rubeena, et al., "Image Compression in Signal-Dependent Noise", Applied Optics, vol. 38, No. 26, Sep. 10, 1999, pp. 5560-5567.
Chavel, P., et al., "Film Grain Noise in Partially Coherent Imaging", Optical Engineering, vol. 19, No. 3, May/Jun. 1980, pp. 404-410.
Zhang, Xi Min, et al., "Constant Quality Constrained Rate Allocation for FGS Video Coded Bitstreams", Proceedings of SPIE, vol. 4671, pp. 817-827, 2002.
Peng, Sharon, et al., Adaptive Frequency Weighting for Fine-Granularity-Scalability, Proceedings of SPIE, vol. 4671, pp. 840-849, 2002.
Van Der Schaar, M., et al., "Fine-Granularity for Wireless Video and Scalable Storage", Proceedings of SPIE vol. 4671, pp. 805-816, 2002.
Prades-Nebot, Josep, et al., "Rate Control for Fully Fine Grained Scalable Video Coders", Proceedings of SPIE, vol. 4671, pp. 828-839, 2002.
Yan, Rong, et al., "Efficient Video Coding with Hybrid Spatial and Fine Grain SNR Scalabilities", Proceedings of SPIE vol. 4671, pp. 850-859, 2002.
Conklin, Greg. et al. "Dithering 5-tap Filter for Inloop Deblocking", RealNetworks, Inc., Joint Video Team (JVT) of ISO/IEC MPEG & ITU-T VCEG, May 6-10, 2002, pp. 1-16, VA.
Gomila, Christina, "SEI message for film grain encoding", Thomson Inc., Joint Video Team (JVT) of ISO/IEC MPEG & ITU-T VCEG, XP-002308742, May 23-27, 2003, pp. 1-14, CH.
Gomila, Christina, et al. "Simplification of the JVT deblocking filter", Thomson Multimedia, Joint Video Team (JVT) of ISO/IEC MPEG & ITU-T VCEG, May 6-10, 2002, 16 pgs. VA.
Schlockermann, Martin et al "Film grain coding in H.264/AVC", Panasonic, Joint Video team (JVT) of ISO/IEC MPEG & ITU-T VCEG, Sep. 2-5, 2003, pp. 1-8, San Diego.
Gomila, "SEI Message for Film Grain Encoding: Syntax and Results", JVT of ISO IEC MPEG and ITU-T JVT-1013 Revision 2 Sep. 2, 2003, XP002309743, pp. 1-11.
Bjontegaard,G: "Addition of Comfort Noise as Post Processing" ITU-Telecommunications Standardization Sector, Study Group 16, $2^{nd}$ Meeting, Sunriver, Oregon, Sep. 8-11, 1997.
McMahon, T et al.: "High WQuality SD and HD AVC Test Results" JVT Team of ISO/IEC MPEG & ITU-T VCEG (ISO/IEC JTC1/SC29/WG11 and ITU-T SG16 Q.6) $5^{th}$ Meeting : Geneva,. CH 9-17 Oct. 2002.
Naderi, F. et at: "Estimation of Images Degraded by Film Grain Noise" Applied Optics, vol. 17, Issue 8, pp. 1228-1237, Jan. 1, 1998.
Schaar et al: Fine Granularity Scalability for Wireless Video and Scalable Storage Visual Communications and Image Processing 2002. Proceeding of SPIE, vol. 4671 (2001) SPIE 0277-786X/02.
Iliingworth, et al. "Vision, Image and Signal Processing", The Institute of Electrical Engineers, IEE Proceedings, Jun. 2000. vol. 147, No. 3.
Office Action from U.S. Appl. No. 10/556,833 mailed May 10, 2010.
Final Office Action from U.S. Appl. No. 10/556,833 mailed Oct. 20. 2010.
Office Action ADV Action from U.S. Appl. No. 10/556,833 mailed Jan. 7, 2011.
Office Action from U.S. Appl. No. 10/556,833 mailed Feb. 15, 2011.
Office Action from U.S. Appl. No. 10/556,833 mailed May 10, 2011.
Office Action from U.S. Appl. No. 10/556,833 mailed Sep. 30, 2011.
Final Office Action from U.S. Appl. No. 10/571,148 mailed May 12, 2010.
Office Action from U.S. Appl. No. 10/571,148 mailed Sep. 10, 2010.
Office Action from U.S. Appl. No. 10/572,280 mailed Mar. 19, 2010.
Office Action from U.S. Appl. No. 10/572,820 mailed May 11, 2010.
Final Office Action from U.S. Appl. No. 10/572,280 mailed Sep. 30, 2010.

Final Office Action from U.S. Appl. No. 10/575,676 mailed Mar. 4, 2020.
Office Action from U.S. Appl. No. 10/575,676 mailed Jul. 19, 2011.
Final Office Action from U.S. Appl. No. 10/575,676 mailed Oct. 26, 2011.
Office Action ADV Action from U.S. Appl. No. 10/575,676 Mailed Jun. 7, 2010.
Office Action from U.S. Appl. No. 10/581,151 mailed Jan. 20, 2010.
Final Office Action from U.S. Appl. No. 11/246,848 mailed Jul. 6, 2010.
Final Office Action from U.S. Appl. No. 11/246,848 mailed Oct. 13, 2010.
Office Action from U.S. Appl. No. 11/268,070 mailed Jul. 21, 2010.
Final Office Action from U.S. Appl. No. 11/268,070 mailed Nov. 12, 2010.
Office Action ADV Action from U.S. Appl. No. 11/268,070 mailed Jan. 11, 2011.
Office Action from U.S. Appl. No. 11/268,010 mailed Jun. 22, 2011.
Office Action from U.S. Appl. No. 11/273,067 mailed Aug. 4, 2010.
Office Action from 11/284,378 mailed Dec. 22, 2010.
Office Action from U.S. Appl. No. 11/285,540 mailed Nov. 23, 2010.
Office Action from U.S. Appl. No. 11/285,540 mailed Mar. 30, 2011.
Office Action from U.S. Appl. No. 11/667,581 mailed Jun. 8. 2011.
Office Action from U.S. Appl. No. 11/667,629 mailed Jul. 9, 2010.
Final Office Action from U.S. Appl. No. 11/667,629 mailed Nov. 19, 2010.
Office Action from U.S. Appl. No. 11/667,629 mailed Jan. 13, 2011.
Final Office Action from U.S. Appl. No. 11/667,629 mailed Apr. 22, 2011.
Office Action from U.S. Appl. No. 11/667,816 mailed Sep. 15, 2011.
Final Office Action from U.S. Appl. No. 11/667,816 mailed Oct. 14, 2011.
Final Office Action from U.S. Appl. No. 11/667,816 mailed Dec. 5, 2011.
Office Action from U.S. Appl. No. 11/667,846 mailed Oct. 4, 2011.
Final Office Action from U.S. Appl. No. 11/667,581 mailed Oct. 14, 2011.

* cited by examiner

FILM GRAIN SIMULATION METHOD

CROSS-REFERENCE TO RELATED APPLICATIONS

This application is a continuation of U.S. application Ser. No. 11/246,848, filed Oct. 7, 2005 now abandoned, herein incorporated by reference.

TECHNICAL FIELD

This invention relates to a technique for simulating film grain in an image.

BACKGROUND OF THE INVENTION

Motion picture films comprise silver-halide crystals dispersed in an emulsion, coated in thin layers on a film base. The exposure and development of these crystals form the photographic image consisting of discrete tiny particles of silver. In color negatives, the silver undergoes chemical removal after development and tiny blobs of dye occur on the sites where the silver crystals form. These small specks of dye are commonly called 'grain' in color film. Grain appears randomly distributed on the resulting image because of the random formation of silver crystals on the original emulsion. Within a uniformly exposed area, some crystals develop after exposure while others do not.

Grain varies in sizes and shapes. The faster the film, the larger the clumps of silver formed and blobs of dye generated, and the more they tend to group together in random patterns. The grain pattern is typically known as 'granularity'. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and high-definition images, whereas film grain progressively loses importance in SDTV and becomes imperceptible in smaller formats.

Motion picture film typically contains image-dependent noise resulting either from the physical process of exposure and development of the photographic film or from the subsequent editing of the images. The photographic film possesses a characteristic quasi-random pattern, or texture, resulting from physical granularity of the photographic emulsion. Alternatively, a similar pattern can be simulated over computed-generated images in order to blend them with photographic film. In both cases, this image-dependent noise is referred to as grain. Quite often, moderate grain texture presents a desirable feature in motion pictures. In some instances, the film grain provides visual cues that facilitate the correct perception of two-dimensional pictures. Film grain is often varied within a single film to provide various clues as to time reference, point of view, etc. Many other technical and artistic uses exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into a natural scene. Cineon® from Eastman Kodak Co, Rochester N.Y., one of the first digital film applications to implement grain simulation, produces very realistic results for many grain types. However, the Cineon® application does not yield good performance for many high-speed films because of the noticeable diagonal stripes the application produces for high grain size settings. Further, the Cineon® application fails to simulate grain with adequate fidelity when images are subject to previous processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

None of these past schemes solves the problem of restoring film grain in compressed video. Film grain constitutes a high frequency quasi-random phenomenon that typically cannot undergo compression using conventional spatial and temporal methods that take advantage of redundancies in the video sequences. Attempts to process film-originated images using MPEG-2 or ITU-T Rec. H.264|ISO/IEC 14496-10 compression techniques usually either result in an unacceptably low degree of compression or complete loss of the grain texture.

Thus, there exists a need for a technique simulating film grain, especially a technique that affords relatively low complexity.

BRIEF SUMMARY OF THE INVENTION

Briefly, in accordance with a preferred embodiment of the present principles, simulation of a block of film grain for addition to a macroblock of an image occurs by first establishing at least one image parameter at least in part in accordance with at least one attribute of the macroblock. Thereafter, a block of film grain is established in accordance with the image parameter.

DETAILED DESCRIPTION OF THE DRAWINGS

DETAILED DESCRIPTION

Figure 1:
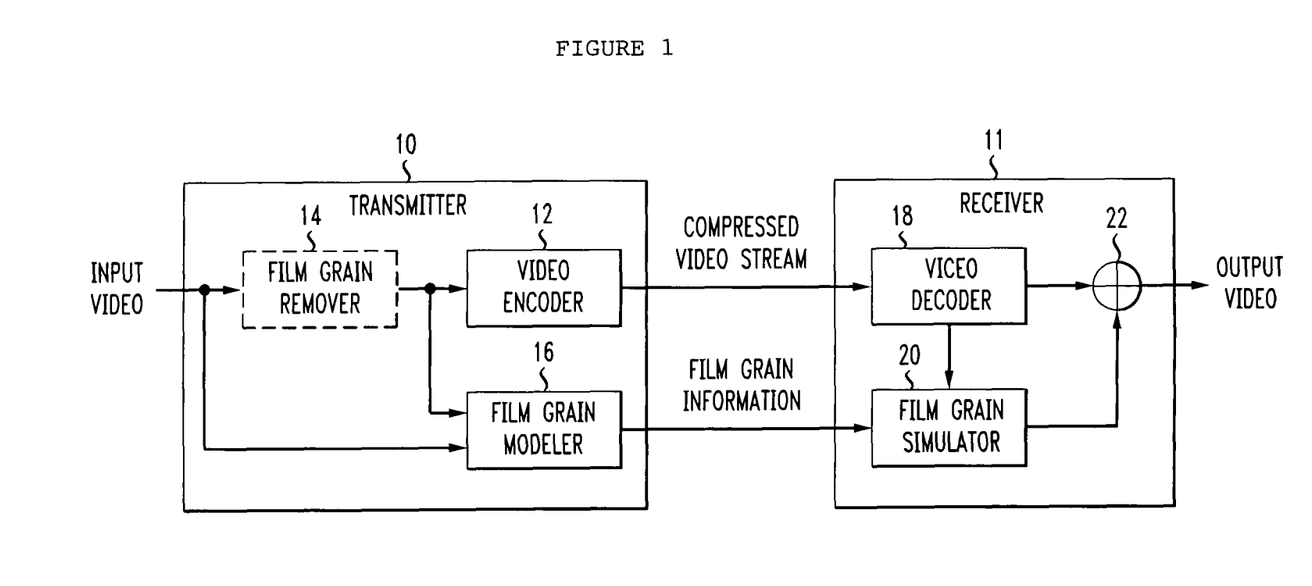
FIG. 1 depicts a block schematic diagram of the combination of a transmitter and receiver in a film grain processing chain useful for practicing the technique of the present principles.

To understand the technique of the present principles for simulating a bit-accurate film grain pattern comprised of individual film grain blocks, a brief overview of film grain simulation will prove helpful. FIG. 1 depicts a block schematic diagram of a transmitter 10, which receives an input video signal and, in turn, generates a compressed video stream at its output. In addition, the transmitter 10 also generates information indicative of the film grain (if any) present in the sample. In practice, the transmitter 10 could comprises part of a head-end array of a cable television system, or other such system that distributes compressed video to one or more downstream receivers 11, only one of which is shown in FIG. 1. The transmitter 10 could also take the form of encoder that presents media like DVDs. The receiver 11 decodes the coded video stream and simulates film grain in accordance with the film grain information and decoded video, both received from the transmitter 10 or directly from the media itself in the case of a DVD or the like, to yield an output video stream that has simulated film grain. The receiver 11 can take the form of a set-top box or other such mechanism that serves to decode compressed video and simulate film grain in that video.

The overall management of film grain requires the transmitter 10 (i.e., the encoder) provide information with respect to the film grain in the incoming video. In other words, the transmitter 10 "models" the film grain. Further the receiver 11 (i.e., decoder) simulates the film grain according to the film grain information received from the transmitter 10. The transmitter 10 enhances the quality of the compressed video by enabling the receiver 11 to simulate film grain in the video signal when difficulty exists in retaining the film grain during the video coding process.

In the illustrated embodiment of FIG. 1, the transmitter 10 includes a video encoder 12 which encodes the video stream using any of the well known video compression techniques such as the ITU-T Rec. H.264|ISO/IEC 14496-10 video compression standard. Optionally, a film grain remover 14, in the form of a filter or the like depicted in dashed lines in FIG. 1, could exist upstream of the encoder 12 to remove any film grain in the incoming video stream prior to encoding. To the extent that the incoming video contains no film grain, no need would exist for the film grain remover 14.

A film grain modeler 16 accepts the input video stream, as well as the output signal of the film grain remover 14 (when present). Using such input information, the film grain modeler 16 establishes the film grain in the incoming video signal. In its simplest form, the film grain modeler 16 could comprise a look up table containing film grain models for different film stocks. Information in the incoming video signal would specify the particular film stock originally used to record the image prior to conversion into a video signal, thus allowing the film grain modeler 16 to select the appropriate film grain model for such film stock. Alternatively, the film grain modeler 16 could comprise a processor or dedicated logic circuit that would execute one or more algorithms to sample the incoming video and determine the film grain pattern that is present.

The receiver 11 typically includes a video decoder 18 that serves to decode the compressed video stream received from the transmitter 10. The structure of the decoder 18 will depend on the type of compression performed by the encoder 12 within the transmitter 10. Thus, for example, the use within the transmitter 10 of an encoder 12 that employs the ITU-T Rec. H.264|ISO/IEC 14496-10 video compression standard to compress outgoing video will dictate the need for an H.264-compliant decoder 18. Within the receiver 11, a film grain simulator 20 receives the film grain information from the film grain modeler 16. The film grain simulator 20 can take the form of a programmed processor, or dedicated logic circuit having the capability of simulating film grain for combination via a combiner 22 with the decoded video stream.

Film grain simulation aims to synthesize film grain samples that simulate the look of the original film content. As described, film grain modeling occurs at the transmitter 10 of FIG. 1, whereas film grain simulation occurs at the receiver 11. In particular, film grain simulation occurs in the receiver 11 along with the decoding the incoming video stream from the transmitter 10 upstream of the output of the decoded video stream. Note that the decoding process that occurs in the receiver 11 makes no use of images with added film grain. Rather, film grain simulation constitutes a post-processing method for synthesizing simulated film grain in the decoded images for display. For that reason, the ITU-T Rec. H.264|ISO/IEC 14496-10 video compression standard contains no specifications regarding the film grain simulation process. However, film grain simulation requires information concerning the grain pattern in the incoming video signal, which information typically undergoes transmission in a Supplemental Enhancement Information (SEI) message when using the ITU-T Rec. H.264|ISO/IEC 14496-10 video compression standard as specified by the Amendment 1 (Fidelity Range Extensions) of that compression standard.

The film grain simulation technique of the present principles enables bit-accurate film grain simulation and has applications to consumer products, such as HD DVD players for example. Other potential applications could include set top boxes, television sets, and even recording devices such as camcorders and the like. Film grain simulation occurs after decoding the video bit-stream and prior to pixel display. The film grain simulation process requires the decoding of film grain supplemental information transmitted in the SEI message. Specifications affecting the film grain SEI message ensure the technology will meet the requirements of high definition systems in terms of quality and complexity.

The value of the parameters conveyed in an ITU-T Rec. H.264|ISO/IEC 14496-10 film grain characteristics SEI message follow these constraints:

The parameter model_id specifies the simulation model. It shall be 0, which identifies the film grain simulation model as frequency filtering.

The parameter separate_colour_description_present_flag specifies whether the color space in which the film grain parameters are estimated is different from the color space in which the video sequence has been encoded. This parameter equals 0, which indicates that the color space for film grain simulation is the same than for encoding.

The parameter blending_mode_id specifies the blending mode used to blend the simulated film grain with the decoded images. This parameter equals 0, which corresponds to the additive blending mode.

The parameter log2_scale_factor specifies the logarithmic scale factor used to represent the film grain parameters in the SEI message. This parameter lies in the range [2, 7] to ensure the film grain simulation can occur using 16-bit arithmetic.

The parameters intensity_interval_lower_bound[j][i] and intensity_interval_upper_bound[j][i] specify the limits of the intensity interval i of color component j for which film grain parameters have been modeled. For all j and i, intensity_interval_lower_bound[j][i+1], this parameter remains greater than intensity_interval_upper_bound[j][i] since multi-generational film grain is not allowed.

The parameter num_model_values_minus1[j] specifies the number of model values present in each intensity interval for color component j. For all j, this parameter lies in the range [0, 2], which specifies that band-pass filtering and cross-color correlation are not supported.

The parameter comp_model_value[j][i][0] specifies the film grain intensity for color component j and intensity interval i. For all j and i, this parameter lies in the range [0, 255] to ensure film grain simulation can be performed using 16-bit arithmetic.

The parameter comp_model_value[j][i][1] specifies the horizontal high cut frequency that characterizes the film grain shape for color component j and intensity interval i. (The horizontal high and low cut frequencies, together with the vertical high and low cut frequencies that describe the properties of a two-dimensional filter that characterizes the desired film grain pattern). For all j and i, this parameter lies in the range [2, 14], which includes all the required grain patterns.

The parameter comp_model_value[j][i][2] specifies the vertical high cut frequency that characterizes a film grain shape for color component j and intensity interval i. For all j and i, this parameter shall be in the range [2, 14] which includes all the required grain patterns. For the combination of all the color components j and intensity intervals i in an SEI message, the number of different pairs (comp_model_value[j][i][1], comp_model_value[j][i][2]) remains not greater than 10.

All the other parameters in the film grain SEI message specified by the ITU-T Rec. H.264|ISO/IEC 14496-10 standard have no constraint according to this specification.

In accordance with the present principles, bit accurate film grain simulation occurs in the current picture unless the parameter film_grain_characteristics_cancel_flag equals unity or the frame range specified by the parameter film_grain_characteristics_repetition_period becomes exhausted. The current specifications of the ITU-T Rec. H.264|ISO/IEC 14496-10 standard allows the simulation of film grain in all color components. Film grain is simulated and added to color component c of the decoded image if the parameter comp_model_present_flag[c] equals unity in the film grain SEI message. Bit-accurate film grain simulation occurs by specifying: a database of film grain patterns; a uniform pseudo-random number generator; and a precise sequence of operations. Film grain simulation typically occurs independently for each color component.

Figure 2:
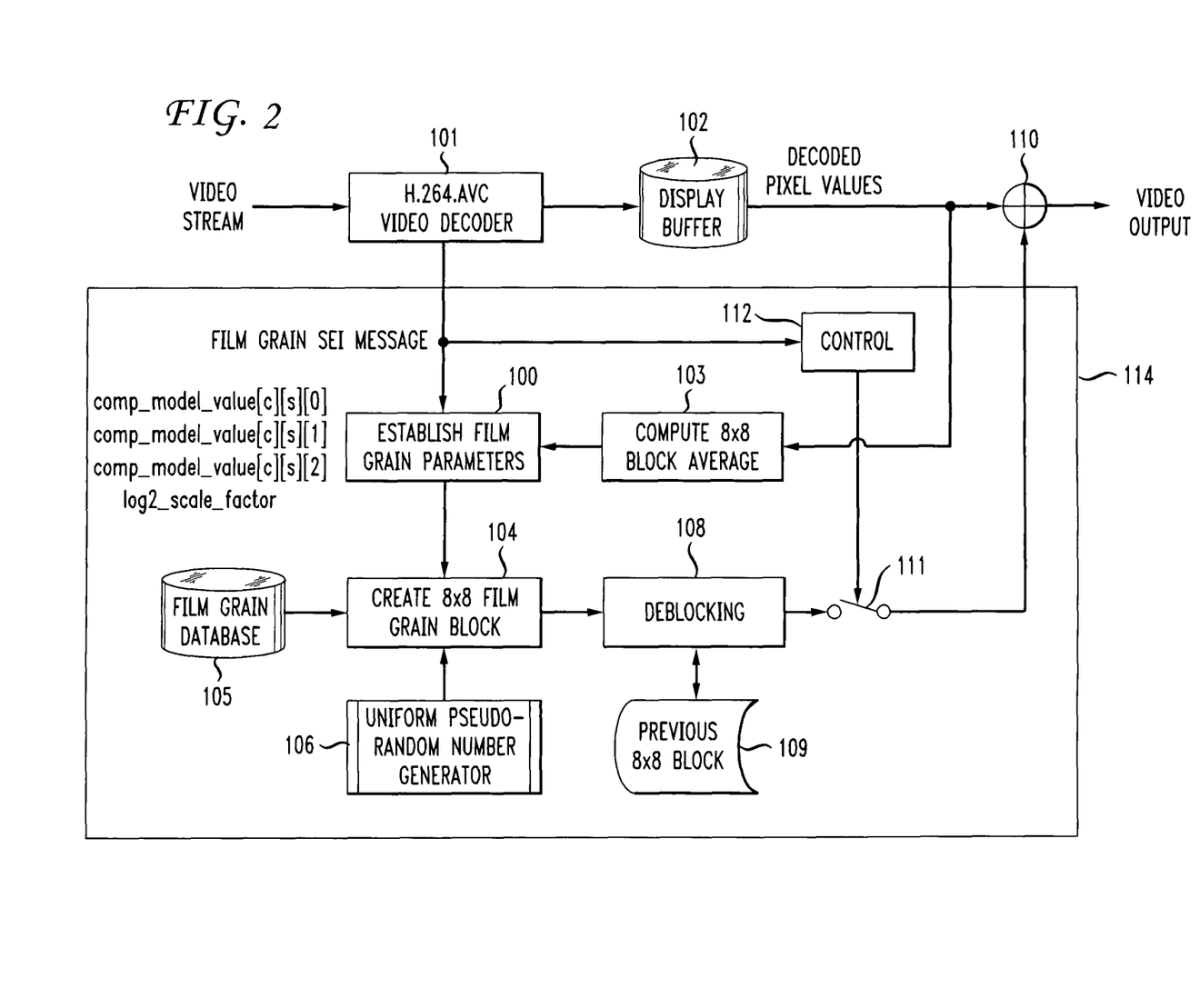
FIG. 2 depicts a block schematic diagram of a system for simulating film grain in accordance with the present principles.

FIG. 2 depicts a block schematic diagram of a method in accordance with a preferred embodiment of the present principles for simulating film grain. The method commences upon execution 100 to establish parameters for the simulated film grain. Part of the process of establishing the film grain parameters for the simulated film grain includes extracting film grain information carried by the incoming video signal. With the incoming video signal encoded using the ITU-T Rec. H.264|ISO/IEC 14496-10 video coding standard, the film grain information will exist in the SEI message. Extracting the SEI message requires decoding of the incoming H-264 coded incoming video signal using a H.264|MPEG-4 AVC-compliant decoder 101 as shown in FIG. 2.

As discussed above, the SEI message contains several parameters, including intensity_interval_lower_bound[c][i] and intensity_interval_upper_bound[c][i] parameters where i ranges from 0 to the value of the parameter num_intensity_intervals_minus1[c]. These SEI message parameters undergo a comparison against the average pixel intensity value computed during step 102 for a color component c of each non-overlapping 8×8 pixel block in the decoded image stored in a display buffer 102 following decoding by the decoder 101. For each non-overlapping 8×8 pixel block from color component c of the decoded image, computation of the average value occurs during step 102 in the following manner:

```
avg = 0
for(i = 0..7, j = 0 . . . 7)
    avg += decoded_image[c][m+i][n+j]
avg = (avg + 32) >> 6
``` where (m,n) are the coordinates of top-left corner of the block and decoded_image[c][x][y] is the decoded pixel value at coordinates (x,y) of a color component c which can take on values of 0, 1 or 2 representing a particular one of three primary color components.

The value of i for which the macroblock average pixel intensity value remain not less than intensity_interval_lower_bound[c][i] and not greater than intensity_interval_upper_bound[c][i] serves as the basis for selecting the film grain parameters for the film grain simulated for the current block in the image. If no value exists that fulfills the condition, no film grain simulation will occur for the current block.

The film grain parameter selection process typically includes the step of scaling the cut frequencies when processing chroma components (c=1, 2) in order to adapt to the 4:2:0 chroma format as follows:
comp_model_value[c][s][1]=Clip(2, 14, (comp_model_value[c][s][1]<<1))
comp_model_value[c][s][2]=Clip(2, 14, (comp_model_value[c][s][2]<<1))

Step 104 initiates establishing a film grain block, typically although not necessarily 8×8 pixels in size. The step of establishing a film grain block of 8×8 pixels involves retrieving a block of 8×8 film grain sample from a film grain database 105, and scaling the sample to the proper intensity, although scaling while desirable need not necessarily occur. The database 103 typically comprises 169 patterns of 4,096 film grain samples, each representing a 64×64 film grain pattern. The database 105 stores the values in 2's complement form, ranging from −127 to 127. Synthesis of each film grain pattern typically occurs using a specific pair of cut frequencies that establish a two-dimensional filter that defines the film grain pattern. The cut frequencies transmitted in the SEI message enable access of the database 105 of film grain patterns during film grain simulation.

The scaled cut frequencies (comp_model_value[c][s][1] and comp_model_value[c][s][2]) determine which pattern of the database serves as the source of film grain samples. Two randomly generated values serve to select an 8×8 block from the pattern selected in accordance with the cut frequencies. These random values used to select the 8×8 pixel film grain block represent a horizontal and vertical offset within the 64×64 pixel pattern and are created using the following procedure:
i_offset=(MSB$_{16}$(x(k, e$_c$)) % 52)
i_offset &=0xFFFC
i_offset+=m&0x0008
j_offset=(LSB$_{16}$(x(k, e$_c$)) % 56)
j_offset &=0xFFF8
j_offset+=n&0x0008
where x(k, e$_c$) indicates the k-th symbol of the sequence x of pseudo-random numbers initiated with the seed e$_c$, MSB$_{16}$ and LSB$_{16}$ denote the 16 most significant bits and 16 least significant bits, respectively, and (m,n) are the coordinates of the current 8×8 block in the decoded image. For the i_offset, the first equation generates a pseudo-random value uniformly distributed in the range [0,51], the second equation restricts that value to multiples of 4, and the last equation adds 8 to i_offset when m % 16 equals 8. Equivalent operations are performed for the j_offset.

Figure 3:
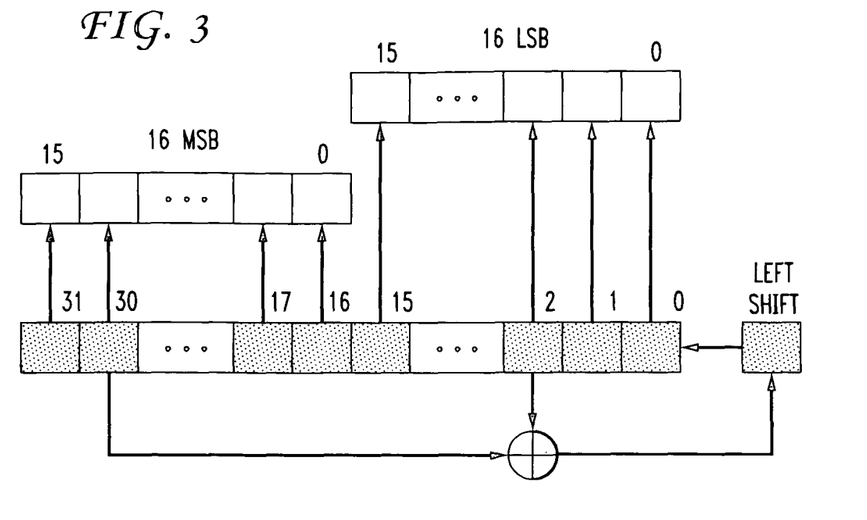
FIG. 3 depicts a block diagram of a shift register for generating a primitive polynomial modulo 2 for simulating film grain in accordance with the method of FIG. 2

A uniform pseudo-random number generator 106 provides the pseudo-random numbers used to select the 8×8 pixel block. Referring to FIG. 3, the pseudo-random number generator 106 typically comprises a 32 bit shift register that implements a primitive polynomial modulo 2 operator, $x^{31}+x^3+1$, to randomly select film grain blocks of 8×8 pixels from the film grain patterns of 64×64 pixels in the database. The two pseudo-random numbers used for 8×8 film grain block selection comprise the 16 Most Significant Bits (MSB) and the 16 Least Significant Bits, respectively output by the shit register.

Figure 4:
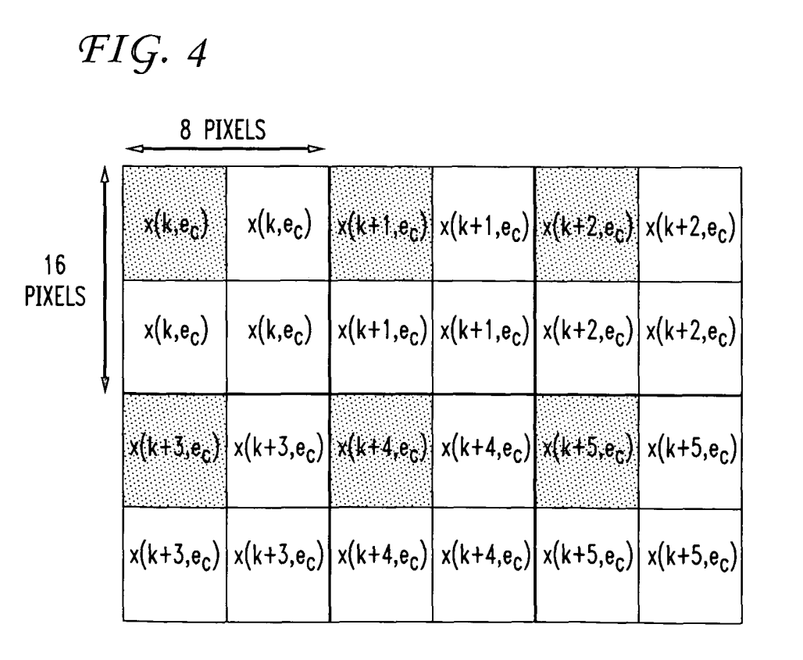
FIG. 4 depicts a pixel grid showing the use of random numbers in generating film grain in accordance with the method of FIG. 2.

The pseudo-random value x(k, $e_c$), created using the pseudo-random number generator 106 undergoes updating every 16 pixels (horizontally) and every 16 lines (vertically) of the image. The same pseudo-random number x(k, $e_c$) is used in each non-overlapping area of 16×16 pixels of the decoded image. As illustrated in FIG. 4, the resulting sequence of pseudo-random values x(k, $e_c$) follows a raster scan order over a 16×16 pixels grid. While the illustrated embodiment assumes a raster scan order of blocks of 8×8 pixels, other implementations remain possible.

The random number generator 106 has different seeding depending on the color component (c) to which film grain is being added. Upon receipt of a film grain SEI message, the seed e1, used for simulating film grain on the first color component, typically has a value of unity. The seed e2, used for simulating film grain on the second color component, typically has a value of 557,794,999; whereas the seed e3, used for simulating film grain on the third color component, typically has a value of 974,440,221.

Referring to FIG. 2, after computing the random offsets, extraction of 64 film grain values from the database and scaling (if necessary) occurs as follows:

```
scale_factor = BIT_0(x(k, e_c)) == 0 ? comp_model_value[c][s][0] : −
comp_model_value[c][s][0]
for (i = 0 . . . 7, j = 0 . . . 7)
    g = scale_factor * database[h][v][i + i_offset][j+j_offset]
    film_grain_block[i][j] = (((g + 2^(log2_scale_factor − 1)) >>
        log2_scale_factor ) + 32) >> 6
``` where h is equal to comp_model_value[c][s][1]−2, v is equal to comp_model_value[c][s][2]−2 and the factor 6 scales the film grain values retrieved from the film grain pattern database. $BIT_0$ denotes the LSB.

During step 108, deblocking filtering occurs between each film grain block created during step 104 and a previous block 109 to ensure the seamless formation of film grain patterns. Deblocking filtering applies only to the vertical edges between adjacent blocks. Assuming simulation of film grain blocks in raster scan order and that the left-most pixels of the current_fg_block lie adjacent to the right-most pixels of the previous_fg_block, deblocking filtering typically occurs by means of a 3-tap filter with coefficients 1,2,1 (not shown) as follows:

```
for (i = 0, j = 0 . . . 7)
    current_fg_block[i][j] = ( previous_fg_block[i + 7][j] +
             (current_fg_block [i    ][j] << 1) +
              current_fg_block [i + 1][j] + 2) >> 2
    previous_fg_block[i + 7][j] = ( previous_fg_block[i + 6][j] +
             (previous_fg_block[i + 7][j] << 1) +
              current_fg_block [i    ][j] + 2) >> 2
```

At the end of the film grain simulation process, the deblocked film grain block undergoes blending with the corresponding decoded image block via a block 110 and the result undergoes clipping to [0, 255] prior to display in the following manner:

```
for (i = 0..7, j = 0..7)
display_image[c][m+i][n+j] = Clip(0, 255, decoded_image[c][m+i][n+j] +
                                          fg_block[i][j])
``` where (m,n) are the coordinates of the top-left corner of the block, decoded_image[c][x][y] is the decoded pixel value at coordinates (x,y) of color component c and display_image[c][x][y] is the video output at the same coordinates.

A switching element 111 controls the passage of the deblocked film grain block to the block 110 under the control of a control element 112. The control element 112 controls the switching element responsive to whether the SEI message parameter film_grain_characteristics_cancel_flag equals unity or the frame range specified by the parameter film_grain_characteristics_repetition_period has been exceeded which dictate whether film grain simulation should occur as discussed above.

The foregoing describes a technique for simulating film grain that has application in consumer electronic devices, such as set top boxes, HD-DVD players, television sets, and camcorders. The relatively low cost of random access memory readily permits incorporation of the film grain database 105 within a memory element. The combination of one or more of a microprocessor, programmable gate array and dedicated logic circuit, depicted generally in block 114 in FIG. 2 can readily execute the steps of establishing the film grain parameters, creating a film grain block and deblocking filtering, to yield a film grain block for addition to a video image.

What is claimed is:

1. A method for simulating a film grain block, comprising the steps of:
    establishing at least one parameter at least in part in accordance with an attribute of an incoming image;
    establishing at least one block of film grain in accordance with the at least one parameter by:
        (a) providing a plurality of film grain patterns for selection;
        (b) randomly selecting from among the plurality of film grain patterns a source pattern by (1) generating first and second pseudo-random numbers; (2) generating first and second offsets within the film grain pattern based on the first and second pseudo-random numbers; and (3) extracting the film grain block at a location in the film grain pattern specified by the first and second offsets; and
        (c) selecting from the source pattern a block of film grain; and
    applying deblocking filtering only to the vertical edges of the film grain block.

2. The method according to claim 1 wherein the at least one image parameter comprises average pixel intensity.

3. The method according to claim 2 further comprising the step of thresholding the average pixel intensity in accordance with upper and lower pixel intensity thresholds contained in supplemental information accompanying the image.

4. The method according to claim 1 further comprising the step of scaling the extracted film grain block.

5. The method according to claim 1 wherein the step of generating the first and second pseudo-random numbers further comprises the steps of:
    seeding a shift register with a seed value selected in accordance with a color component of the macroblock, and
    extracting a set of most significant bits as the first pseudo-random number; and
    extracting a set of least significant bits as the second pseudo-random number.

6. The method according to claim 1 further comprising the step of blending the deblocked film grain pattern with the image block.

7. The method according to claim 1 wherein the deblocking step further comprises the step of deblocking the vertical edges between adjacent blocks of film grain.

8. A method for simulating film grain in a 4:2:0 chroma format in at least one block of an image, comprising the steps of:
   establishing at least one film grain parameter in 4:2:0 chroma format in accordance with at least one attribute of the at least one block by scaling cut frequencies; and
   deriving a film grain block from a database of film grain patterns by randomly selecting the film grain block from the database in accordance with the at least one film grain parameter.

9. The method according to claim 8 further comprising the step of deblocking at least a portion of the derived film grain block.

10. The method according to claim 8 further comprising the step of blending the deblocked film grain block with the at least one image block.

11. Apparatus for simulating a film grain block, comprising:
   a film grain simulator for establishing at least one parameter at least in part in accordance with an attribute of incoming image, and for establishing at least one block of film grain for blending in a decoded image in accordance with the parameter, the film grain simulator including a deblocking filter for only filtering the vertical edges of the film grain block, the film grain simulator having means for establishing at least one block of film grain in accordance with the at least one parameter, including means for providing a plurality of film grain patterns for selection; means for randomly selecting from among the plurality of film grain patterns a source pattern by (1) generating first and second pseudo-random numbers; (2) generating first and second offsets within the film grain pattern based on the first and second pseudo-random numbers; and (3) extracting the film grain block at a location in the film grain pattern specified by the first and second offsets; and means for selecting from the source pattern a block of film grain.

12. The apparatus according to claim 11 wherein the at least one image parameter comprises average pixel intensity.

13. The apparatus according to claim method 12 further including means for thresholding the average pixel intensity in accordance with upper and lower pixel intensity thresholds contained in supplemental information accompanying the image.

14. The apparatus according to claim 11 further comprising means for scaling the extracted film grain block.

15. The apparatus according to claim 11 wherein the means for generating the first and second pseudo random numbers further comprises:
   a shift register seeded with a value selected in accordance with a color component of the macroblock, for yielding a set of most significant bits as the first pseudo-random number and a set of least significant bits as the second pseudo-random number.

* * * * *